United States Patent [19]
Kuo

[11] Patent Number: 5,293,762
[45] Date of Patent: Mar. 15, 1994

[54] AUTOMOBILE LOCK

[76] Inventor: Stanley Kuo, P.O. Box 82-144, Taipei, Taiwan

[21] Appl. No.: 991,385

[22] Filed: Dec. 16, 1992

[51] Int. Cl.$^5$ ............................................... B60R 25/02
[52] U.S. Cl. ........................................ 70/238; 70/58; 70/199; 70/211
[58] Field of Search ............... 70/14, 57, 58, 199–212, 70/225, 226, 238

[56] References Cited

U.S. PATENT DOCUMENTS

| | | | |
|---|---|---|---|
| 4,825,670 | 5/1989 | Snow | 70/238 |
| 4,856,304 | 8/1989 | Derman | 70/58 X |
| 4,922,734 | 5/1990 | Iannucci | 70/58 |
| 4,972,693 | 11/1990 | Inouye | 70/238 |
| 4,974,433 | 12/1990 | Wang | 70/238 X |

*Primary Examiner*—Peter M. Cuomo
*Assistant Examiner*—Suzanne L. Dino
*Attorney, Agent, or Firm*—Alfred Lei

[57] ABSTRACT

An automobile lock including a locking member provided with a locking core in the interior and a clamp for engaging a steering wheel on the outer side, a transmission member, an adjusting member, a telescopic rod extending through the adjusting member, provided with a universal joint connected with an insert plate, and having a plurality of teeth, and a gearing having a first gear disposed in the locking member, a second gear in the transmission member, a third and a fourth gears in the adjusting member, a slider between the third gear and the fourth gear, a fifth gear mounted on the other end of the slider, a sixth gear in said adjusting member, and a latch bolt at the other end of the sixth gear for engaging with a tooth of the telescopic rod, whereby the automobile lock may be used to lock the steering wheel as well as the cassette tape recorder.

1 Claim, 4 Drawing Sheets

AUTOMOBILE LOCK

BACKGROUND OF THE INVENTION

It has been found that there are many kinds of automobile locks in use and on the market, which have almost the same principle that the lock is hooked on the steering wheel, extending out of it for preventing the steering wheel from rotating. However, such automobile locks cannot be used to prevent the phonographic equipment from being stolen.

Therefore, it is an object of the present invention to provide an automobile lock which may obviate and mitigate the above-mentioned drawbacks.

SUMMARY OF THE INVENTION

This invention relates to an improved automobile lock.

It is the primary object of the present invention to provide an automobile lock which may prevent the phonographic equipment from being stolen.

It is another object of the present invention to provide an automobile lock which is simple in construction.

It is still another object of the present invention to provide an automobile lock which is easy to operate.

It is still another object of the present invention to provide an automobile lock which may fix the steering wheel in position.

It is a further object of the present invention to provide an automobile lock which is economic to produce.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
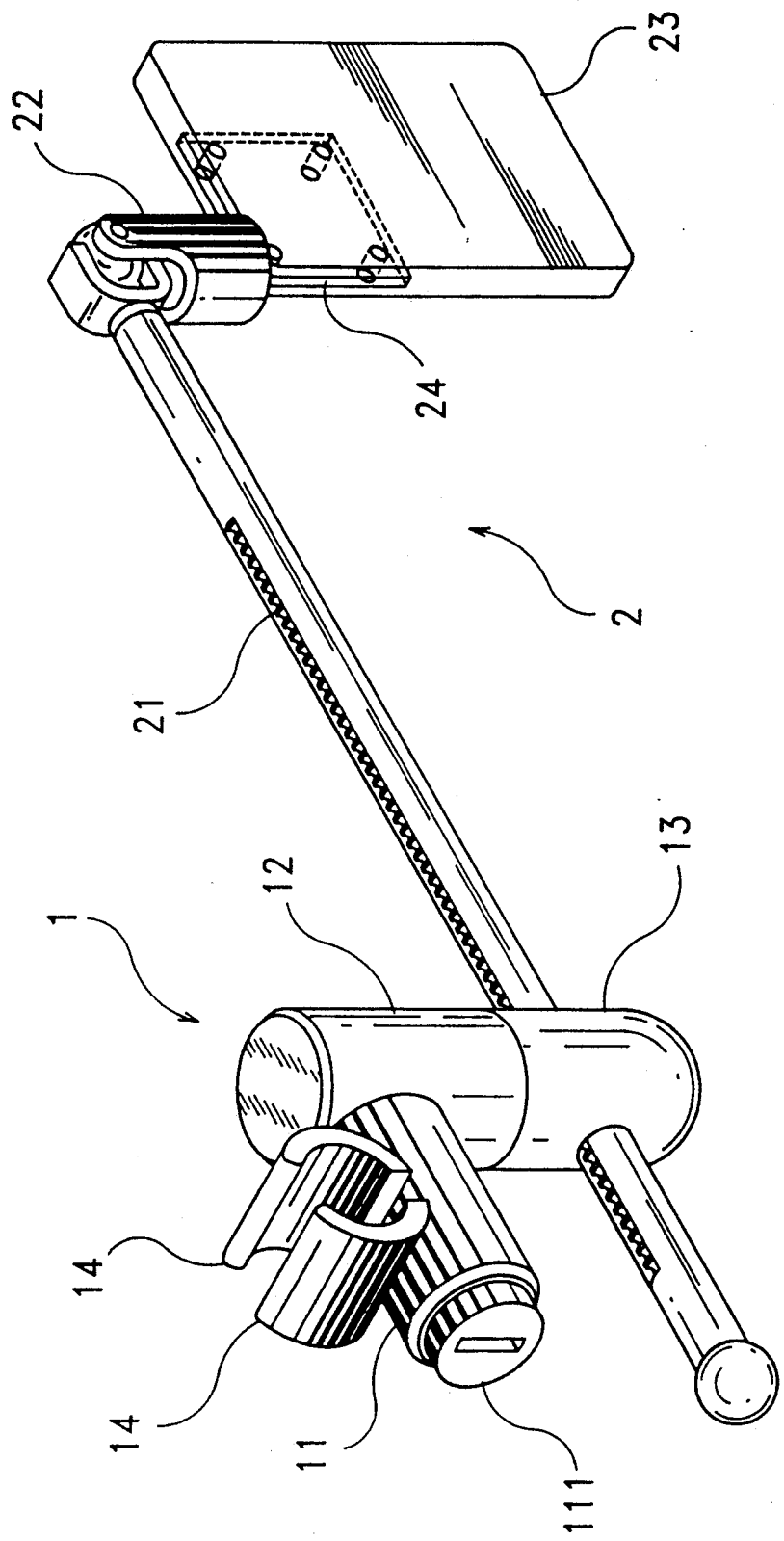
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the present invention mainly comprises a locking member 11, a transmission member 12, and an adjusting member 13. The locking member 11 is provided with a locking core 111 in its interior and a clamp 14 for engaging a steering wheel (not shown) on its outer side. A telescopic rod 2 extends through the adjusting member 13 and is formed with a plurality of teeth 21. Further, the end of the telescopic rod 2 is provided with a universal joint 22 which is connected with an insert plate 23. The insert plate 23 has the same size as a cassette tape which is preferably made of plastic and has a sheet steel 24 connected with the universal joint 22.

Figure 2:
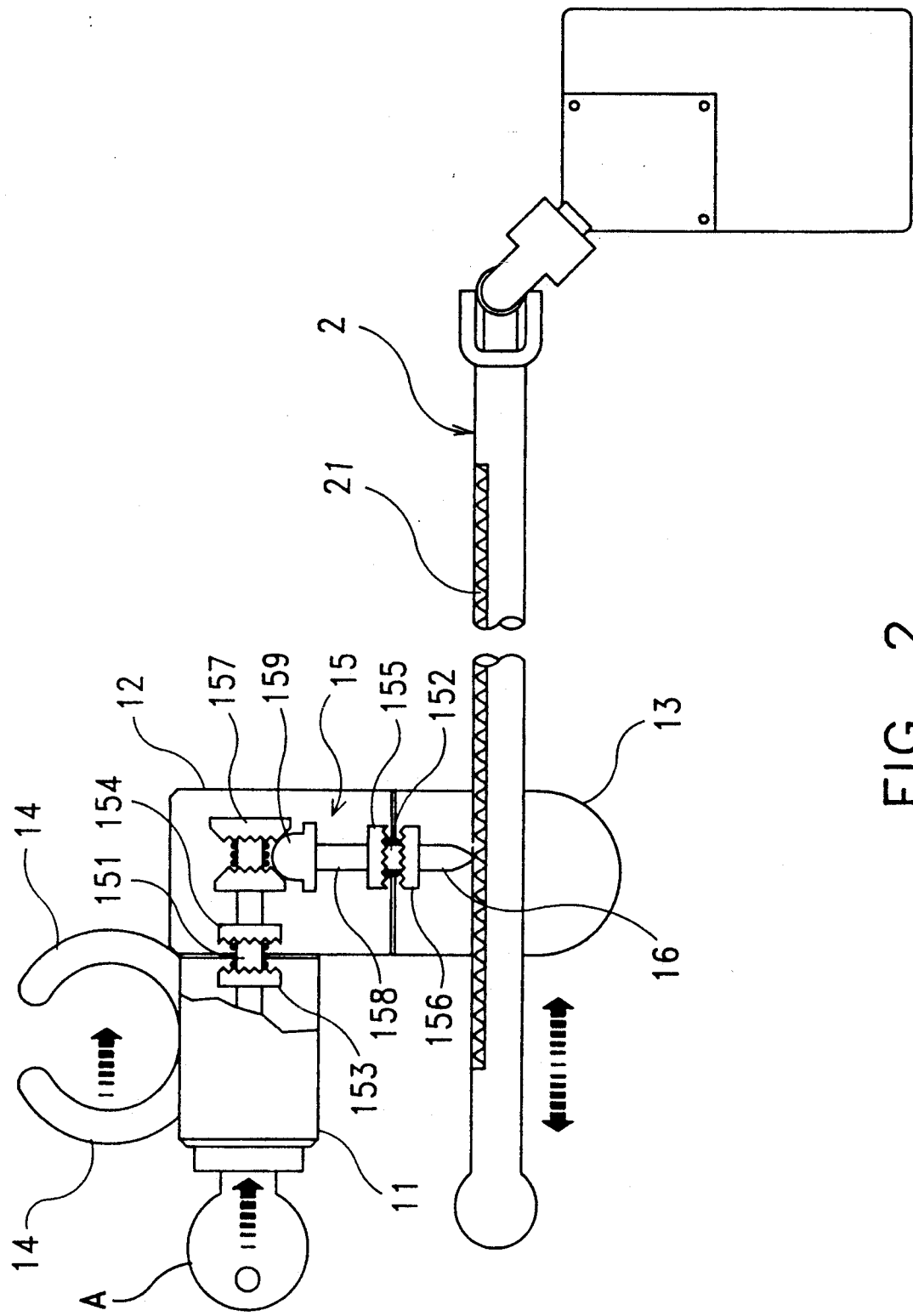
FIG. 2 shows the interior structure of the present invention.
Figure 3:
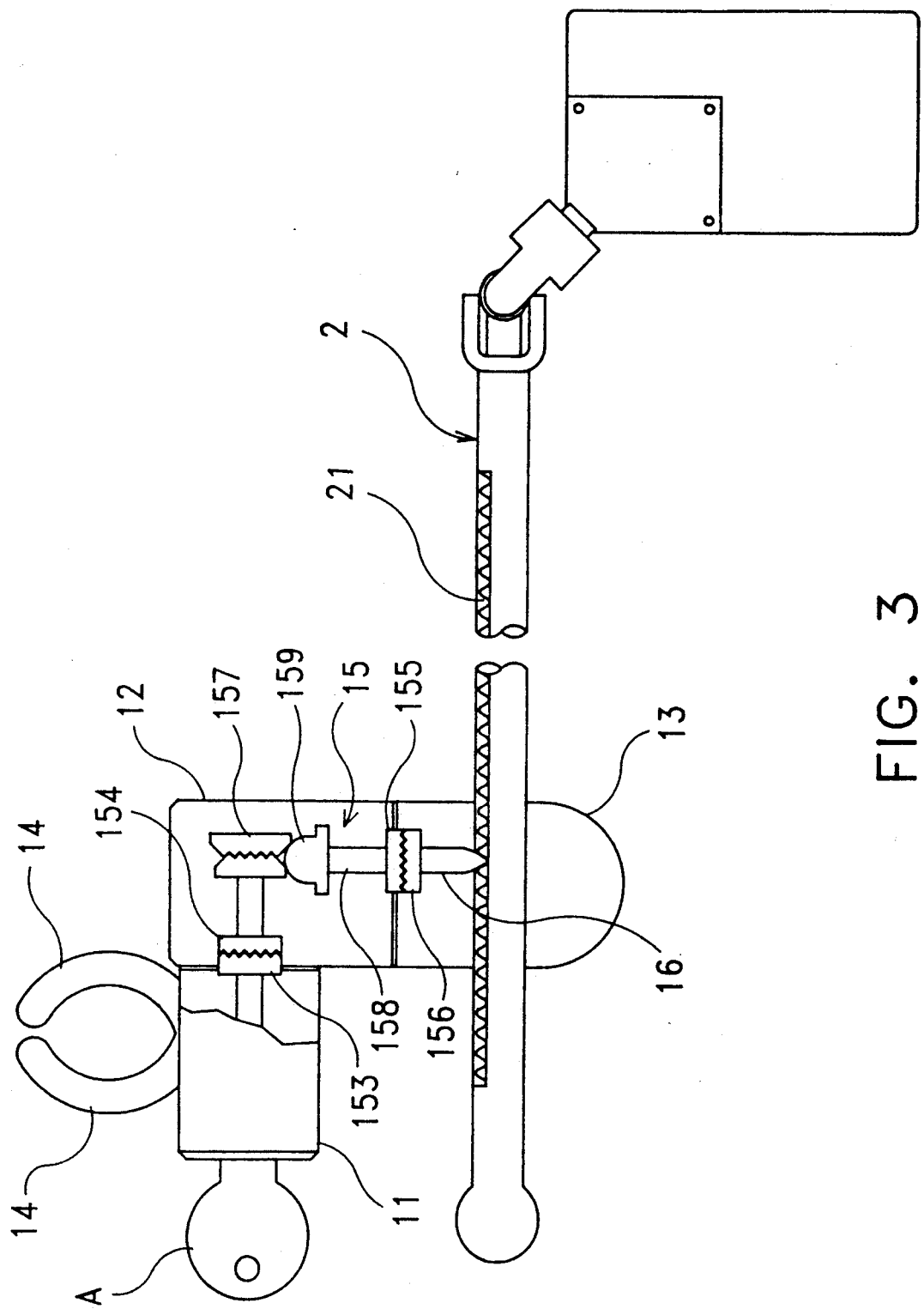
FIG. 3 shows the locking principle of the present invention.

Referring to FIGS. 2 and 3, the locking member 11, the transmission member 12 and the adjusting member 13 are connected together by a gearing 15. The locking member 11 and the transmission member 12 may be rotated through an angle of 360 degrees with respect to the axle 151, while the transmission member 12 and the adjusting member 13 may be turned through an angle of 360 degrees about the axle 152. In addition, the axle 151 is provided with two engageable gears 153 and 154 in which the gear 153 is mounted in the locking member 11 and the gear 154 is disposed in the transmission member 12. Further, the axle 152 is provided with two engageable gears 155 and 156 in which the former gear 155 is fitted into the transmission member 12 and the latter gear 156 into the adjusting member 13. Moreover, the transmission member 12 is provided with two engageable gears 157 between which there is a slider 159 with an rod 158. As a key A is inserted into the lock core 111 of the locking member 11 and turned to lock the present invention, the clamp 14 will be forced to grip the steering wheel and the gears 157 will be pushed together thereby pressing the slider 159 to go downward. When the slider 159 is moved downward, the gear 155 will mesh with the gear 156 and the latch bolt 16 will be forced downward to engage with the tooth 21 of the telescopic rod 2. Hence, the locking member 11, the transmission member 12, the adjusting member 13, the clamp 14, and the telescopic rod 2 will be locked in a fixed position.

Figure 4:
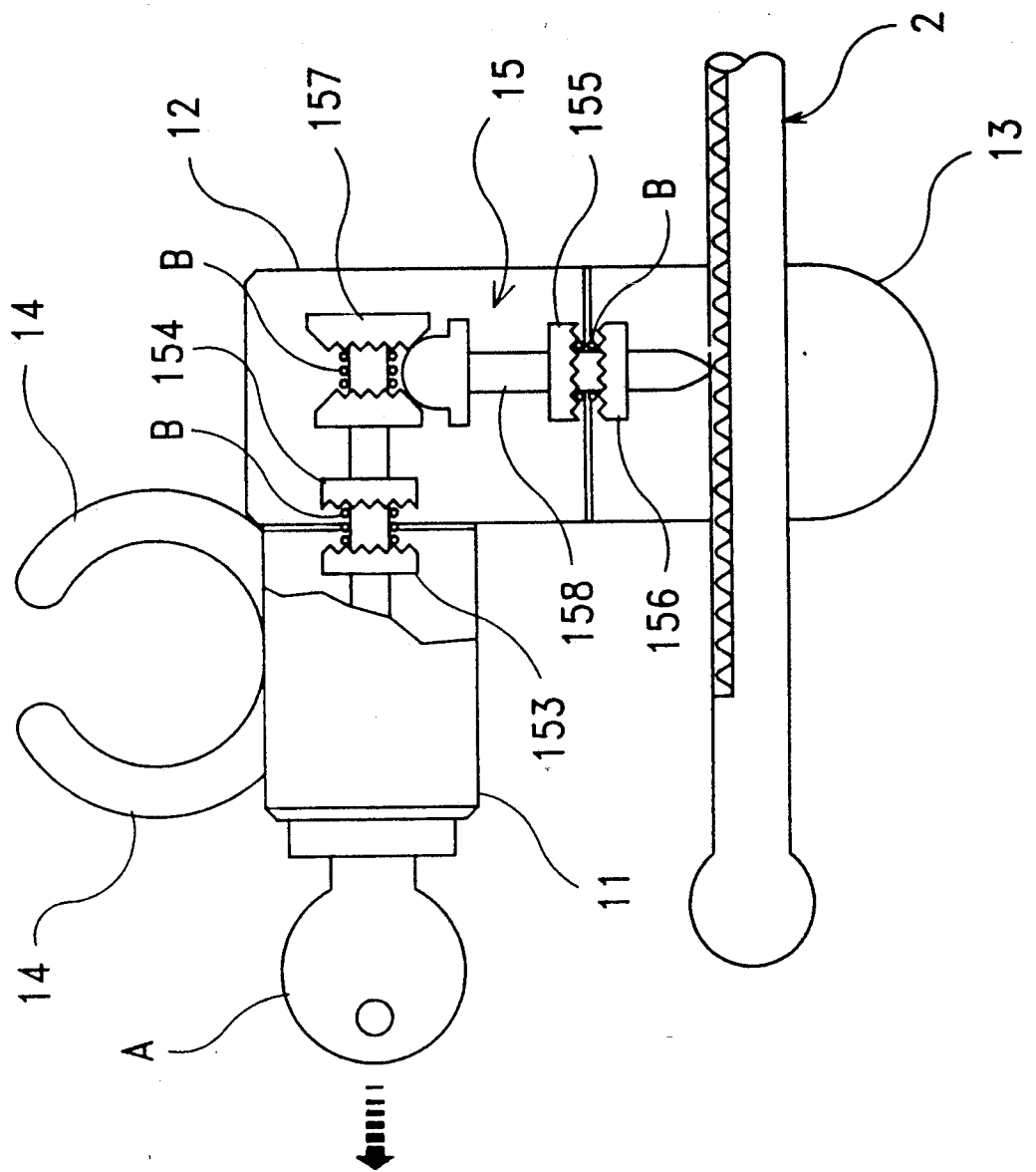
FIG. 4 shows the unlocking principle of the present invention.

As illustrated in FIG. 4, the gears 153, 154, 155 and 156 and the gears 157 are provided with a spring B so that when the key A is pulled out of the lock core 11, the spring B will separate the gear 153 from the gear 154, the gear 155 from the gear 156, and the two gears 157 from each other. Thus, the locking member 11, the transmission member 12, the adjusting member 13, the clamp 14, and the telescopic rod 2 will become movable again.

The operation of the present invention is described as follows:

1. Insert the plate 23 into the tape cassette recorder of an automobile. As the insert plate 23 is connected with the universal joint 22, it can be adapted to a tape cassette recorder at any position. Further, the insert plate 23 is provided with a sheet steel 23 thereby preventing it from being severed.

2. Adjust the length of the telescopic rod 2 as required.

3. Rotate the locking member 11, the transmission member 12 and the adjusting member 13 so as to enable the clamp 14 to engage the steering wheel. Since the locking member 11, the transmission member 12, and the adjusting member 13 may be rotated through an angle of 360 degrees with respect to one another and so they can be adjusted as required.

4. Insert the key A into the lock core 11 of the locking member 11 and turn it to lock the locking member 11, the transmission member 12, the adjusting member 13, the clamp 14, and the telescopic rod 2 in position.

5. When desired to open the lock, simply pull out the key A from the core 111 of the locking member 11 thereby releasing the gearing 15.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An automobile lock for locking a steering wheel and a cassette tape deck, comprising:
   a locking member provided with a locking core in an interior portion and a clamp for engaging a steering wheel on an outer side;
   a transmission member connected with said locking member by a gearing;
   an adjusting member connecting with said transmission member by said gearing; and
   a telescopic rod extending through said adjusting member, provided at an end with a universal joint connected with an insert plate for insertion into a cassette tape deck slot, and having a plurality of teeth;
   said gearing having a first gear disposed in said locking member, a second gear mounted in said transmission member and engageable with said first gear, a third gear and a fourth gear mounted in said transmission member and engageable with each other, a slider between said third gear and said fourth gear, a fifth gear mounted on another end of said slider, a sixth gear in said adjusting member and engageable with said fifth gear, and a latch bolt at another end of said sixth gear for engaging a tooth of said telescopic rod.

* * * * *